United States Patent
Van Cleemput

(10) Patent No.: US 6,766,810 B1
(45) Date of Patent: Jul. 27, 2004

(54) METHODS AND APPARATUS TO CONTROL PRESSURE IN A SUPERCRITICAL FLUID REACTOR

(75) Inventor: Patrick A. Van Cleemput, Sunnyvale, CA (US)

(73) Assignee: Novellus Systems, Inc., San Jose, CA (US)

( * ) Notice: Subject to any disclaimer, the term of this patent is extended or adjusted under 35 U.S.C. 154(b) by 232 days.

(21) Appl. No.: 10/078,213

(22) Filed: Feb. 15, 2002

(51) Int. Cl.$^7$ .......................... B08B 13/00; F04B 23/02
(52) U.S. Cl. .................. 134/1.3; 134/56 R; 137/12; 137/557; 138/5; 417/36; 417/38
(58) Field of Search .................. 210/97, 137, 143, 210/198.2, 511, 634, 90, 741, 761, 656; 137/12, 14, 78.1, 557; 134/1.3, 56 R, 57 R, 58 R, 902; 138/5; 417/14, 36, 38; 422/112; 438/5

(56) References Cited

U.S. PATENT DOCUMENTS

| | | | | |
|---|---|---|---|---|
| 4,998,116 A | * | 3/1991 | Regnault ..................... | 347/6 |
| 5,011,819 A | * | 4/1991 | Leibovitz ..................... | 505/510 |
| 5,133,859 A | * | 7/1992 | Frank et al. .................. | 210/198.2 |
| 5,173,188 A | * | 12/1992 | Winter et al. ................. | 210/634 |
| 5,789,027 A | * | 8/1998 | Watkins et al. ............... | 427/250 |
| 5,908,510 A | * | 6/1999 | McCullough et al. ......... | 134/2 |

OTHER PUBLICATIONS

PGPUBS US2001/0050096, Dec. 13, 2001, Costantini et al.*
Costantini et al., "Supercritical Fluid Delivery and Recovery System for Semiconductor Wafer Processing", Pub. No.: US 2001/0050096 A1, Pub. Date: Dec. 13, 2001, Appl. No.: 09/837,507, Filed: Apr. 18, 2001, pp. 1–15.
Chandra et al., "Supercritical Fluid Cleaning Process for Precision Surfaces", Pub. No.: US 2002/0014257 A1, Pub Date: Feb. 7, 2002, Appl. No. 09/861,298, Filed: May 18, 2001, pp. 1–21.

* cited by examiner

Primary Examiner—Joseph Drodge
(74) Attorney, Agent, or Firm—Beyer, Weaver & Thomas, LLP.

(57) ABSTRACT

The present invention pertains to methods and apparatus for controlling the pressure in a supercritical processing system. Active methods for controlling the pressure include anticipating a pressure deviation due to a solute addition to a system, and changing the pressure within the system to compensate for the deviation. In this way, a desired pressure is achieved when the solute is added, without phase separation of the solute from the solvent. Pressure is adjusted by changing the volume of the supercritical processing system. Passive methods include adjusting the pressure of a supercritical system by changing the volume in response to a pressure deviation from a desired pressure. Apparatus for controlling the pressure in a supercritical processing system are described.

39 Claims, 4 Drawing Sheets

METHODS AND APPARATUS TO CONTROL PRESSURE IN A SUPERCRITICAL FLUID REACTOR

FIELD OF THE INVENTION

The present invention pertains to methods and apparatus for controlling the pressure within a supercritical processing system.

BACKGROUND OF THE INVENTION

Supercritical fluids are effective mediums for reagent transport, reaction, and removal of impurities. Supercritical fluids are particularly useful for integrated circuit fabrication, including deposition of thin films and cleaning wafers and circuit devices. What is lacking in the art are more reliable and practical apparatus and methods of controlling pressure fluctuations in supercritical fluids during processing.

In conventional supercritical processing apparatus, pressure deviations from desired operating pressures are compensated for in different ways, depending on the deviation. For example, systems are typically vented for positive deviations in pressure. Negative deviations in pressure usually entail heating or pumping more fluid into the system to increase the pressure.

Each of the above-mentioned methods has drawbacks, for example, when trying to maintain a constant operating pressure of a supercritical solution containing a solvent and a solute (for example a chemical additive). Venting supercritical solutions causes loss of solute and solvent, potentially expensive materials. Pumping more solvent or solution into a system either dilutes the existing solution or at the very least requires additional material costs. Heating a supercritical solution to build pressure, for example after a pressure drop due to a solute addition, can take unacceptable time periods or potentially destroy or decay heat sensitive solutes.

Additionally, in semiconductor processing for example, very tight pressure windows need to be maintained for uniform processes. For many solutes, there is a small pressure range in which the solute will remain soluble in a given supercritical solvent or solvent system. Adding to this issue, oftentimes addition of solutes causes a concomitant pressure change due to for example solubilization thermodynamics. When conventional apparatus fail to compensate for such pressure deviations quickly enough, solutes can precipitate or otherwise move out of phase with the supercritical medium.

What is needed therefore are improved methods and apparatus for controlling the pressure in a supercritical processing system. Preferably methods and apparatus that control pressure by changing the volume of a supercritical system during supercritical processing.

SUMMARY OF THE INVENTION

The present invention pertains to methods and apparatus for controlling the pressure in a supercritical processing system. Active methods for controlling the pressure include anticipating a pressure deviation due to a solute addition to a system, and changing the pressure within the system to compensate for the deviation. In this way, a desired pressure is achieved when the solute is added, without phase separation of the solute from the solvent. Pressure is adjusted by changing the volume of the supercritical processing system. Passive methods include adjusting the pressure of a supercritical system by changing the volume in response to a pressure deviation from a desired pressure. Apparatus for controlling the pressure in a supercritical processing system are described.

Thus, one aspect of the invention is an apparatus for controlling the pressure in a supercritical processing system. Such apparatus may be characterized by the following features: a pressure monitor configured to measure the pressure in the supercritical fluid processing system; a volume adjusting mechanism configured to variably change the volume of the supercritical processing system; and a controller configured to receive pressure information from the pressure monitor and deliver instructions to the volume adjusting mechanism, based on comparison of the pressure information with a pre-defined pressure.

Preferably the volume adjusting mechanism includes a vessel in fluid communication with the supercritical fluid processing system, the total volume of the supercritical processing system comprising the volume of the vessel; a piston contained within the vessel, the piston capable of a bidirectional movement within the vessel; and a driver for providing the bi-directional movement to the piston. Preferably the bidirectional movement of the piston causes either an increase or a decrease in the volume of the vessel, thereby causing a corresponding increase or decrease in the total volume of the supercritical processing system. Preferably the volume adjusting mechanism is a syringe pump. Preferably the vessel is in fluid communication with a process vessel, a recirculation loop, or a supercritical fluid supply line of the supercritical processing system. Preferably the response time for adjusting the pressure is between about 1 and 2 seconds, more preferably about 1 second.

Preferably controllers of the invention include a microprocessor or computer, each with an associated logic for receiving pressure information from the pressure monitor and delivering instructions to the volume adjusting mechanism, based on comparison of the pressure information with a pre-defined pressure. Also preferably, the total time required for a signal to pass from the pressure monitor, to the controller, and from the controller to the volume adjusting mechanism is between about 30 and 200 milliseconds, more preferably about 100 milliseconds. Preferably the controller is configured to instruct the volume adjusting mechanism to maintain the pre-defined pressure in the supercritical processing system, when a deviation of about ±100 pounds per square inch from the predefined pressure is received by the controller, more preferably about ±25 pounds per square inch. Preferably the nominal operating pressure within the supercritical processing system is between about 1,000 and 5,000 pounds per square inch.

Another aspect of the invention is a method of controlling the pressure within a supercritical processing system. Such methods may be characterized by the following sequence: detecting a pressure deviation within the supercritical processing system from a pre-defined pressure to a second pressure; and changing the volume of the supercritical processing system to return the pressure within the supercritical processing system to approximately the pre-defined pressure. Preferably methods of the invention apply to nominal operating pressures within the supercritical processing system of between about 1,000 and 5,000 pounds per square inch. Preferably the pressure deviations within this range are about ±100 pounds per square inch from the pre-defined pressure, more preferably about ±25 pounds per square inch.

Preferably changing the volume of the supercritical processing system to return the pressure within the supercritical processing system to approximately the predefined pressure is performed in between about 1 and 2 seconds more preferably about 1 second. Also preferably, in methods of the invention, changing the volume of the supercritical processing system to return the pressure within the supercritical processing system to approximately the pre-defined pressure is performed using a volume adjusting mechanism in fluid communication with the supercritical processing system.

Yet another aspect of the invention is a method of controlling the pressure within a supercritical processing system. Such methods may be characterized by the following sequence: receiving information for an anticipated pressure deviation, from a pre-defined pressure to a second pressure, due to a solute addition to a supercritical medium within said supercritical processing system; and applying a corrective pressure deviation, approximately equal in magnitude but opposite in value to said anticipated pressure deviation, to compensate for the anticipated pressure deviation. Preferably, the corrective pressure deviation is applied by changing the volume of the supercritical processing system.

Preferably, the nominal operating pressure within the supercritical processing system is between about 1,000 and 5,000 pounds per square inch. Also, preferably such methods further include choosing solute addition parameters so that the anticipated pressure deviation is about ±100 pounds per square inch from the pre-defined pressure, more preferably about ±25 pounds per square inch from the pre-defined pressure.

Preferably active and passive methods of the invention are performed using apparatus of the invention as described herein. One particularly- preferred volume adjusting mechanism includes at least one syringe pump.

These and other features and advantages of the present invention will be described in more detail below with reference to the associated drawings.

DETAILED DESCRIPTION OF THE PREFERRED EMBODIMENTS

Figure 1:
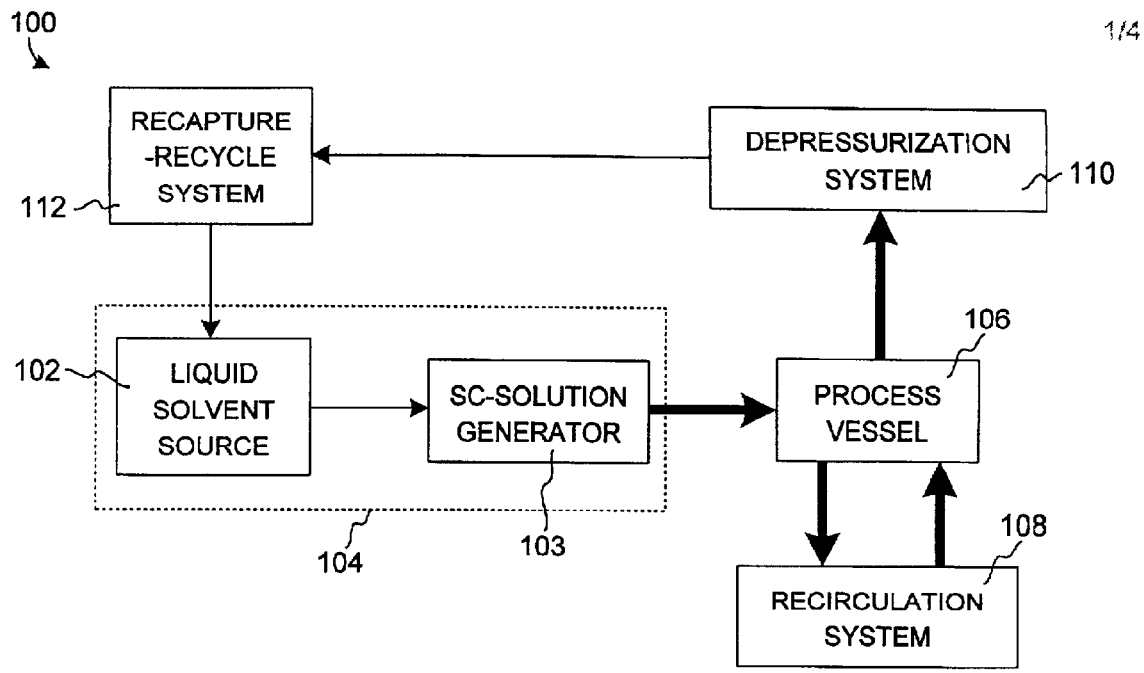
FIG. 1 is a simplified block diagram of a wafer cleaning system that uses supercritical media.

In the following detailed description of the present invention, numerous specific embodiments are set forth in order to provide a thorough understanding of the invention. However, as will be apparent to those skilled in the art, the present invention may be practiced without these specific details or by using alternate elements or processes. In some instances well-knowvn processes, procedures, and components have not been described in detail so as not to unnecessarily obscure aspects of the present invention.

Definitions

In order to describe certain embodiments of the invention, some terms used herein are defined as follows. These definitions are provided to assist the reader in understanding the concepts exemplified in the specification and the definitions do not necessarily limit the scope of this invention.

Supercritical fluid, solution, or solvent—Supercritical fluids or solutions exist when the temperature and pressure of a solution are above its critical temperature and pressure. In this state, there is no differentiation between the liquid and gas phases and the fluid is referred to as a dense gas in which the saturated vapor and saturated liquid states are identical. Near supercritical fluids or solutions exist when the temperature and pressure of a solution are both greater than 80% of their critical point, but the solution is not yet in the supercritical phase. Due to their high density, supercritical and near supercritical fluids possess superior solvating properties. In this application, when a fluid, solvent, or solution is referred to as "supercritical" it is understood to describe both supercritical and near supercritical conditions. In this application, the term "supercritical solution" generally refers to the supercritical form of a solvent and one or more solutes. The solute may be a reagent, a reactant, another solvent, or other material.

Process vessel—A process vessel in this context is a vessel in which a substrate (e.g. a wafer) is exposed to a particular media for the purpose of treating a substrate in some way. For example, a process vessel may be used for cleaning, depositing a layer, or otherwise preparing a surface or surfaces of a semiconductor wafer.

Solute—A solute is a compound that is dissolved in a supercritical solvent. This may include a chemical additive (e.g. cleaning agent, deposition precursor, etc.) that is used to prepare a supercritical solution, a reaction product or by-product, or a residue that is removed from a substrate during cleaning via dissolution into a supercritical solvent.

Methods and Apparatus of the Invention

As mentioned, the present invention pertains to methods and apparatus for controlling the pressure in a supercritical processing system.

Methods of the invention include active and passive methods for controlling pressure. Active methods include anticipating a pressure deviation due to a solute addition to a system, and changing the pressure within the system to compensate for the deviation. In this way, a desired pressure is achieved when the solute is added, for example without phase separation of the solute from the solvent Pressure is adjusted by changing the volume of the supercritical processing system. Passive methods include adjusting the pressure of a supercritical system by changing the volume in response to a pressure deviation from a desired pressure.

Apparatus for controlling the pressure in a supercritical processing system change the total volume of a supercritical processing system in order to effect pressure changes. Apparatus of the invention are described below in relation to a supercritical wafer processing system. Preferably such a system is used for treating (depositing a film, cleaning, or other surface preparation) a wafer or wafers within a process vessel using a supercritical medium.

FIG. 1 shows a wafer cleaning system, 100. Wafer cleaning system 100 is an exemplary system that uses supercritical solutions (containing solutes as described above) to treat wafers. As mentioned, preferably the invention is used in conjunction with such a wafer processing system. Wafer cleaning system 100 is described in more detail in U.S. patent application Ser. No. 10/067,520, filed Feb. 5, 2002, which is incorporated by reference herein for all purposes.

Included in wafer cleaning system 100 are a solvent delivery mechanism 104, a process vessel 106, a recirculation system 108, a depressurization system 110, and a recapture-recycle system 112. Solvent delivery mechanism 104 includes a liquid solvent source 102 and supercritical solution generator 103. Solvent delivery mechanism 104 receives a sub-critical liquid solvent (for example liquid carbon dioxide) and converts it to a supercritical solution. The resulting solution is delivered to process vessel 106 (the heavy arrows in FIG. 1 depict supercritical fluid communication between solvent delivery mechanism 104, process vessel 106, recirculation system 108, and depressurization system 110; the fine arrows depict subcritical fluid communication within apparatus 100). The supercritical solution contacts a wafer or wafers held within process vessel 106. The supercritical solution is recirculated through process vessel 106 (and over the wafer or wafers) via recirculation system 108. After processing the wafers, the supercritical solution is vented via depressurization system 110. Subcritical solvent exits system 110 and is recaptured and processed (preferably recycled) in recapture-recycle system 112. Purified solvents from system 112 are reintroduced into solvent delivery mechanism 104 in a subcritical state (preferably to liquid solvent source 102). Preferably the invention is part of a recirculation system that recirculates supercritical solution through a process vessel as described for recirculation system 108.

Figure 2:
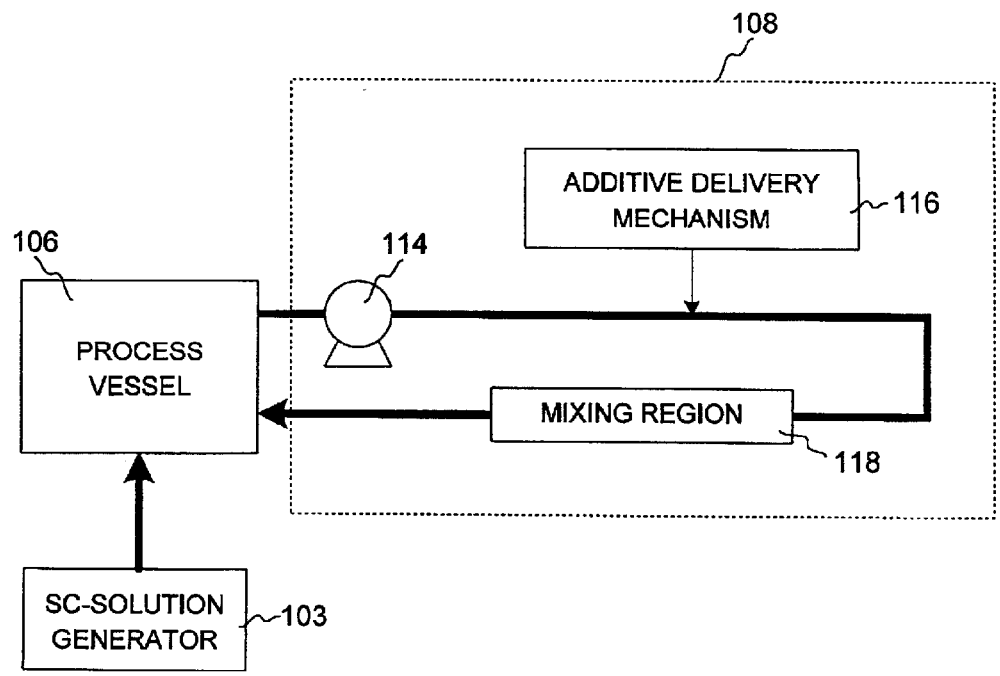
FIG. 2 is a simplified block diagram of components of the wafer cleaning system that contain supercritical media during processing.

FIG. 2 is a simplistic representation of recirculation system, 108 (within dotted line area), in fluid communication with process vessel 106, and supercritical solution generator 103. These are the components of system 100 that contain supercritical fluid during substrate processing. Preferably, recirculation system 108 recirculates a supercritical solution through process vessel 106 such that a flow field is established over at least one surface of a wafer or wafers contained in process vessel 106. Recirculation improves mixing of solutes with supercritical solvents. By adding chemical additives into a flow stream of supercritical solvent, mixing and dissolution of the additives is enhanced.

In its recirculation path, supercritical cleaning solution exits process vessel 106 and enters a recirculation loop. While in the loop, the solution traverses a pump 114, and a mixing region 118. Chemical additives are introduced into the recirculation loop via an additive delivery mechanism 116. In this case, a chemical additive (solute) is introduced into the recirculation loop where it is combined with the supercritical cleaning solution. The mixture of additive and supercritical cleaning solution traverses a portion of the recirculation system (for example) and enters mixing region 118. Mixing region 118 is added "in-line" in the recirculation loop to ensure proper mixing and dissolution of additives in the supercritical cleaning solution. After exiting mixing region 118, the supercritical solution returns to the process vessel.

As mentioned, apparatus of the invention include volume adjusting mechanisms that change the volume of a supercritical processing system in order to effect pressure modulation. In relation to FIG. 2, the volume of a supercritical processing system would include the interior volume of the supercritical fluid feed line supplying the process vessel from generator 103, the interior volume of the process vessel, and the volume of the recirculation system. Pressure controlling apparatus of the invention have volume adjusting mechanisms which include vessels that are configured in fluid communication with the volume of the supercritical processing system, such that the volume of the vessel (or vessels) is included in the total volume of the supercritical processing system. The vessels have variable volumes due to mechanisms within them. Therefore by changing the volume of one such vessel, the volume of the supercritical system is changed. Preferably, the ratio of the maximum volume of the supercritical processing system to the maximum volume of the vessel (or vessels) is between about 16:1 and 4:1, more preferably about 7:1. The volumes are chosen by balancing the effects of large volume change per unit time (potentially less accurate, but fast pressure response) with small volume change per unit time (potentially more accurate, but slow pressure response).

Figure 3:
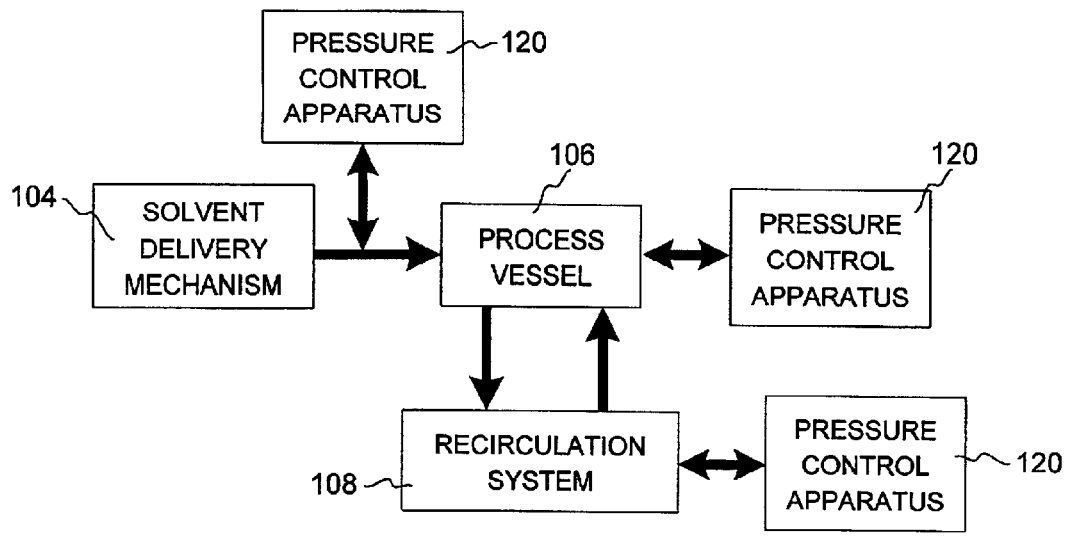
FIG. 3 is depicts preferred locations for pressure controlling apparatus of the invention.

FIG. 3 depicts preferred locations of pressure controlling apparatus of the invention with respect to the supercritical processing system as depicted in FIG. 2. Preferably, vessels of the volume adjusting mechanisms of the apparatus are in fluid communication with a process vessel, a supercritical fluid supply line, or a recirculation system of a supercritical processing system. Depending on the desired flow dynamics of the supercritical media within the processing system, the location of the pressure controlling apparatus may be varied. For example a pressure controlling apparatus of the invention will contribute to the flow pattern of the supercritical fluid within the processing system and thus may be strategically located to take advantage of its influence on the flow field or in some cases to obviate its influence on flow patterns in the supercritical fluid.

Figure 4:
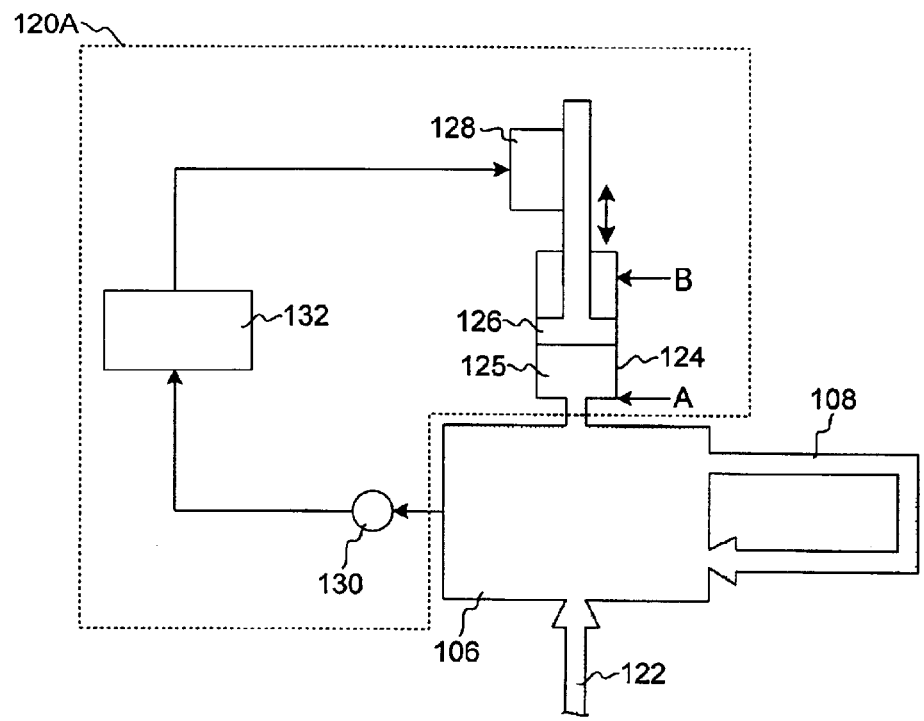
FIG. 4 is a simplified block diagram of a preferred pressure controlling apparatus of the invention.

FIG. 4 depicts an exemplary pressure control apparatus, 120A, of the invention. Apparatus 120A is depicted within the dotted line of FIG. 4. Volume within a supercritical processing system, is depicted in FIG. 4, by inlet 122, recirculation loop 108, and process vessel 106. Pressure control apparatus 120A is in fluid communication with the supercritical processing system via vessel 124, which communicates with process vessel 106. As depicted, the total volume contained within the supercritical processing system includes a volume 125, within the vessel 124. Preferably the ratio of the maximum volume of the supercritical processing system to the maximum volume of vessel 124 is between about 16:1 and 4:1, most preferably 7:1.

Contained within vessel 124 is piston 126. Piston 126 is capable of a bi-directional movement within vessel 124, as indicated by the two-headed arrow next to piston 126. In this example, the face of piston 126 can travel from a position A within vessel 124 to a position B within vessel 124. By changing the position of piston 126 between position A and position B within vessel 124, the volume of supercritical fluid within vessel 124 is changed. Since the volume, 125, contained within vessel 124 is included in the total volume of the supercritical system, changing the volume of supercritical fluid that can be contained within vessel 124, the total volume of the supercritical processing system is changed.

Vessel 124 with its associated piston 126 are an exemplary volume adjusting mechanism of the invention, which is part of the pressure control apparatus 120A. Preferably, but not necessarily, this volume adjusting mechanism is a commercially available syringe pump.

During processing, piston 126 is moved when appropriate to alter the pressure within the system. Preferably the piston includes a plurality of seals that form a fluid-tight seal between the walls of vessel 124 and the piston. Preferably the seals comprise at least one of Viton, EPDM, silicone, Kalrez, Chemrez, polyurethane, fluoropolymer, fiberglass, plastic, polyvinyl chloride, and pvdf-kinar.

In a preferred embodiment, apparatus 120A is used to maintain a preset pressure value during processing. The piston within vessel 124 is controlled via a feed-back loop. Pressure monitor 130 is configured to measure the pressure in the supercritical processing vessel 106. Preferably pressure monitor 130 includes a gage and a pressure transducer. Pressure readings from pressure monitor 130 are delivered to a controller 132. Controller 132 is configured to receive pressure information from the pressure monitor 130, and to deliver instructions to a driver, 128, which provides the bi-directional movement to piston 126. Preferably the driver comprises at least one of a lead screw, a pneumatic cylinder, and the like. Preferably controller 132 includes a microprocessor or computer, each with an associated logic for receiving pressure information from the pressure monitor and delivering instructions to the volume adjusting mechanism, based on comparison of the pressure information with a predefined pressure. For example, a supercritical wafer cleaning process is desired to run at 4,000 pounds per square inch. Preferably the nominal operating pressure within the supercritical processing system is between about 1,000 and 5,000 pounds per square inch. In this example, a deviation from the desired or pre-defined pressure (4,000 psi), is read by controller 132 via pressure monitor 130. Associated logic in controller 132 instructs driver 128 to move piston 126 within vessel 124 such that in volume of the supercritical processing system is adjusted to return the pressure to approximately 4,000 psi. The associated logic may be implemented in any suitable manner. Often it will be implemented in computer hardware and associated software for controlling the operation of the computer.

Preferably controller 132 is configured to maintain the predefined pressure in the supercritical processing system, when a pressure deviation of about ±100 pounds per square inch from the predefined pressure is received by the controller, more preferably about ±25 pounds per square inch from the predefined pressure. Preferably the response time for adjusting the pressure is between about 1 and 2 seconds, more preferably about 1 second. That is, the response time is defined as a time period from a point when the pressure deviation first occurs to a time when the pressure deviation is compensated for, i.e. the pressure is returned to the predefined pressure. In other words, the response time includes the total time required for a signal to pass from pressure monitor 130 to controller 132, for controller 132 to send an instruction signal to driver 128, and for 128 to drive piston 126 to compensate for the pressure deviation. Preferably the total time required for a signal to pass from the pressure monitor to the controller and from the controller to the driver is between about 30 and 200 milliseconds, more preferably about 100 milliseconds.

Figure 5:
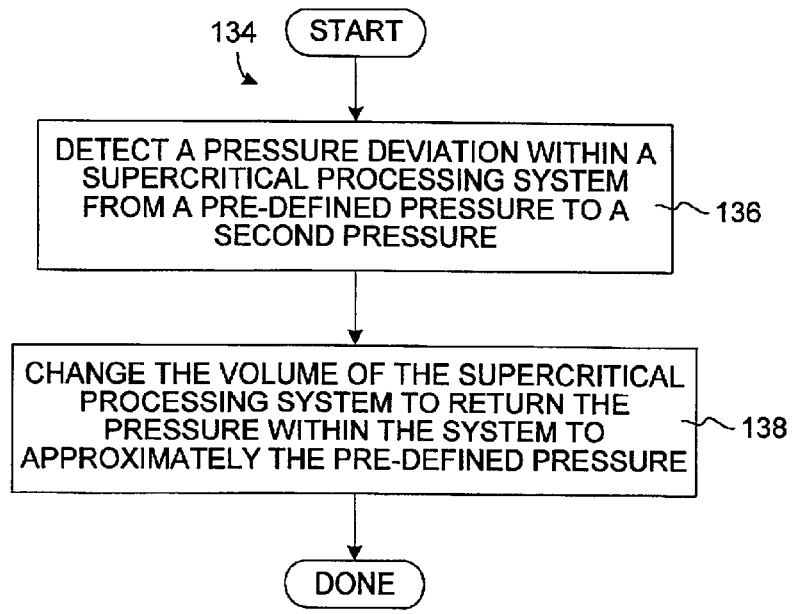
FIGS. 5 and 6 are flowcharts depicting aspects of process flows in accordance with the invention.

Apparatus 120A is a preferred apparatus for performing methods of the invention. As mentioned, one aspect of the invention is a method of controlling the pressure within a supercritical processing system. FIG. 5 depicts a passive method, 134 for controlling pressure within supercritical processing system. Method 134 begins with block 136. First, a pressure deviation from a predefined pressure to a second pressure is detected within a supercritical processing system. Preferably the nominal operating pressure within such a processing system is between about 1,000 and 5,000 psi. Also preferably, the pressure deviation that is detected is between about ±100 pounds per square inch more preferably about ±25 psi from the predefined pressure. Preferably detecting a pressure deviation within the supercritical processing system is performed using a pressure monitor, configured to measure pressure within the supercritical processing system. Preferably a controller, configured to receive information from the pressure monitor, is used to deliver instructions to a volume adjusting mechanism based on comparison of the pressure information with the predefined pressure (algorithm used to calculate the deviation). Preferably the controller includes microprocessor or computer, each with an associated logic for performing the functions as described above.

After the pressure deviation has been detected, the volume is changed so that the pressure returns to approximately the predefined pressure. See 138. Preferably this takes between about 1 and 2 seconds more preferably about 1 second. After the volume of the supercritical processing system has been changed in order to affect the described pressure change, the method is done.

Figure 6:
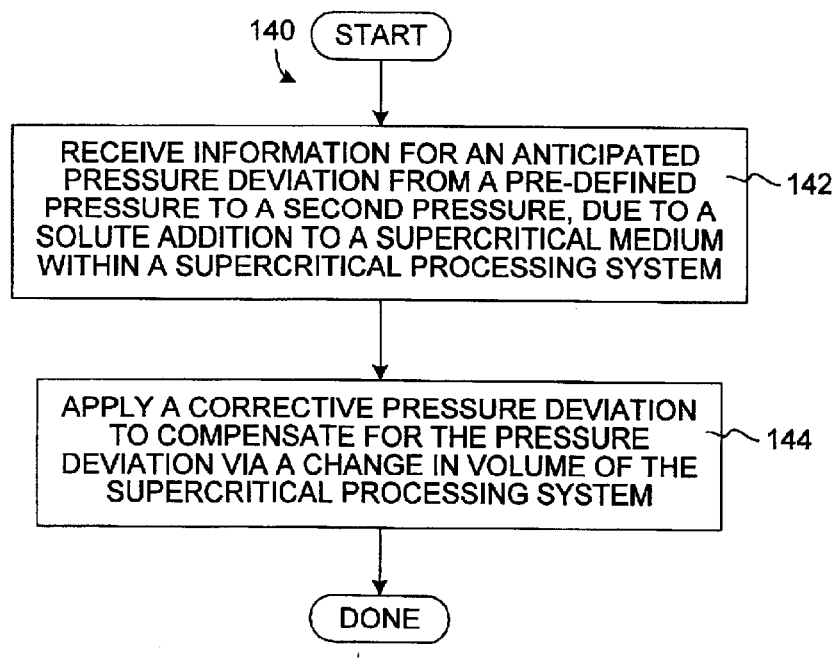

As mentioned the invention includes active methods of controlling pressure within supercritical processing system as well as passive methods as described above. FIG. 6 depicts aspects of such an active method. Method 140 begins at block 142. Information for an anticipated pressure deviation is received. The pressure deviation is from a defmed pressure to a second pressure, due to a solute addition to a supercritical medium within the supercritical processing system. Addition of a solute can include addition of a reagent, a reactant, etc.. There are well-characterized pressure responses due to chemical and/or physical interaction between a solute and a solvent that can be used to anticipate pressure deviations.

Solute solubility depends on temperature and pressure. For a given temperature, solubility increases with increasing pressure (and with increasing density of a material, e.g. $CO_2$). When a solvent is loaded with a maximum amount of solute (to saturation) at a particular pressure, a drop in pressure will cause precipitation of the solute from the solvent. Even if the pressure is returned to its previous level, the solute may not return to solution as quickly as it dissolved the first time. Therefore it is important to know (or anticipate) the pressure response of the system. For example, in order to dissolve polar materials in relatively non-polar supercritical media, co-solvents like alcohols, water, peroxides, etc. may be used. The resultant supercritical media may be a ternary or quaternary mixture. In such cases, the pressure of the system will generally drop quickly when the polar materials and/or cosolvents are introduced into the relatively non-polar supercritical media (e.g. $CO_2$). In another example, when pressure rises quickly ("spikes"), more solute will remain in the solvent instead of reacting with the substrate (as desired). That is, for cleaning applications, the solute (reactants/cleaning agents) may not attack the material to be removed (e.g. photoresist) as fast as it would at a desired lower pressure. For depositions, the solute won't reach the surface at the desired rate for deposition.

Often these pressure drops and spikes are characterized, and if not, the pressure response of similar materials can be determined by extrapolation. Some methods of the invention employ extrapolation from known solute/solvent interactions and their corresponding pressure responses in a particular system. For example, if a pressure response due to an addition of hexane to supercritical carbon dioxide is known, extrapolations are made that similar hydrocarbons will have correspondingly similar effects on pressure.

Based on information for the anticipated pressure deviation from a predefined pressure, a corrective pressure deviation is applied to the supercritical system to compensate for the pressure deviation. The corrective pressure deviation is applied via a change in volume of the supercritical processing system. See 144. After the corrected pressure deviation is applied a method is done.

Figure 7:
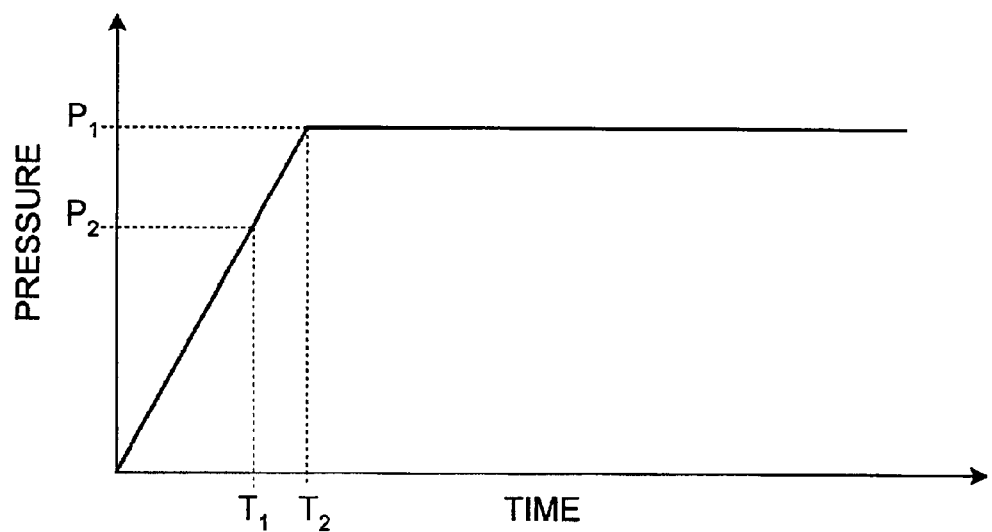
FIGS. 7 and 8 are graphs depicting pressure vs. time curves in accordance with methods of the invention.
Figure 8:
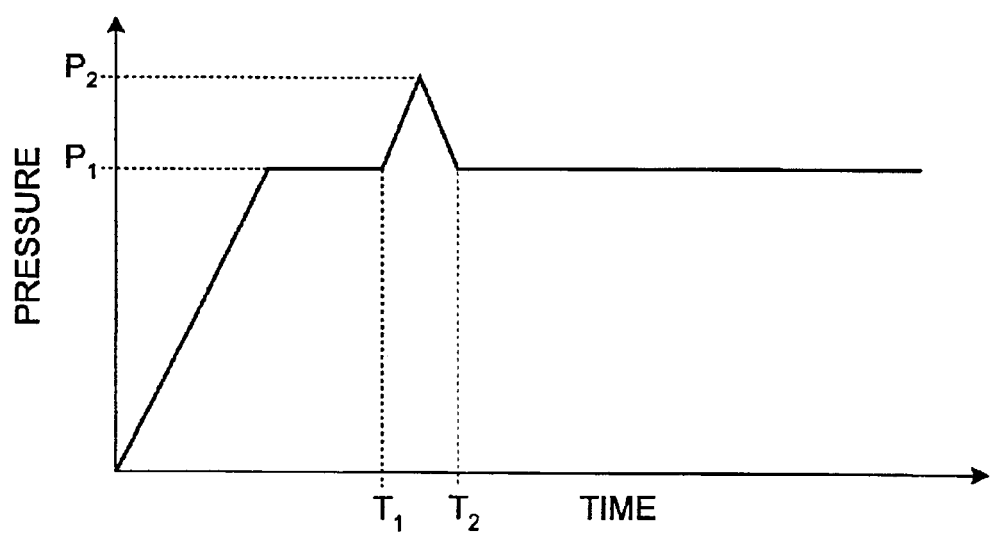

FIGS. 7 and 8 depict pressure verses time curves to illustrate examples of both passive method 134 and active method 140 as described above. First, referring to FIG. 7, a pressure $P_1$ is a predefined or desired pressure to which to run a supercritical process. A supercritical process includes addition of a solute to a supercritical fluid within a processing system. In this example using an active method, the solute addition is anticipated to make a defined pressure deviation from the desired pressure $P_1$, in this case an increase in pressure. Therefore, to compensate for the pressure deviation, a corrective pressure deviation is applied. In this case the pressure within the system is first ramped up to pressure $P_2$, a pressure below the desired pressure $P_1$ over a time up to time $T_1$. At time $T_1$ the solute addition is performed, resulting in a known increasing pressure to desired pressure $P_1$.

Referring to FIG. 8, a pressure $P_1$ is a predefined or desired pressure to which to run a supercritical process. A supercritical process includes addition of a solute to a supercritical fluid within a processing system. In this example using a passive method, the pressure of a supercritical process is brought to $P_1$. At time $T_1$ a solute addition is performed, in this case resulting in an increase in pressure to $P_2$. To compensate for the pressure deviation, a corrective pressure deviation is applied. In this case the pressure within the system is reduced to the desired pressure $P_1$ over a time up to time $T_2$. Preferably the pressure is changed by changing the volume of the system, as described above, in this case the volume is increased to achieve a drop in pressure from $P_2$ to $P_1$.

Although various details have been omitted for clarity's sake, various design alternatives may be implemented. Therefore, the present examples are to be considered as illustrative and not restrictive, and the invention is not to be limited to the details given herein, but may be modified within the scope of the appended claims.

What is claimed is:

1. An apparatus for controlling the pressure in a supercritical processing system, the apparatus comprising:
    a pressure monitor configured to measure the pressure in the supercritical fluid processing system;
        a volume adjusting mechanism configured to variably change the volume of the supercritical processing system, wherein the volume adjusting mechanism comprises:
            a vessel in fluid communication with the supercritical fluid processing system, the total volume of the supercritical processing system comprising the volume of said vessel;
            a piston contained within said vessel, said piston capable of a bi-directional movement within said vessel; and
            a driver for providing the bi-directional movement to the piston, wherein said bi-directional movement of the piston causes either an increase or a decrease in the volume of the vessel, thereby causing a corresponding increase or decrease in the total volume of the supercritical processing system; and
    a controller configured to receive pressure information from the pressure monitor and deliver instructions to the volume adjusting mechanism, based on comparison of the pressure information with a pre-defined pressure.

2. The apparatus of claim 1, wherein the pressure monitor comprises a gauge and a pressure transducer.

3. The apparatus of claim 1, wherein the vessel is in fluid communication with a process vessel of the supercritical processing system.

4. The apparatus of claim 1, wherein the vessel is in fluid communication with a recirculation loop of the supercritical processing system.

5. The apparatus of claim 1, wherein the vessel is in fluid communication with a supercritical fluid supply line of the supercritical processing system.

6. The apparatus of claim 1, wherein the piston comprises a plurality of seals that form a fluid-tight seal between the walls of the vessel and the piston.

7. The apparatus of claim 6, wherein the seals comprise at least one of Viton, EPDM, silicone, Kalrez, Chemrez, polyurethane, fluoropolymer, fiberglass, plastic, polyvinyl chloride, and pvdf-kinar.

8. The apparatus of claim 1, wherein the driver comprises at least one of a lead screw and a pneumatic cylinder.

9. The apparatus of claim 1, wherein the controller comprises a microprocessor or computer, each with an associated logic for receiving pressure information from the pressure monitor and delivering instructions to the volume adjusting mechanism, based on comparison of the pressure information with a pre-defined pressure.

10. The apparatus of claim 1, wherein the nominal operating pressure within the supercritical processing system is between about 1,000 and 5,000 pounds per square inch.

11. The apparatus of claim 10, wherein the controller is configured to instruct the volume adjusting mechanism to maintain the pre-defined pressure in the supercritical processing system, when a deviation of about ±100 pounds per square inch from the pre-defined pressure is received by the controller.

12. The apparatus of claim 11, wherein the response time for adjusting the pressure is between about 1 and 2 seconds.

13. The apparatus of claim 12, wherein the total time required for a signal to pass from the pressure monitor, to the controller, and from the controller to the volume adjusting mechanism is between about 30 and 200 milliseconds.

14. The apparatus of claim 10, wherein the controller is configured to instruct the volume adjusting mechanism to maintain the pre-defined pressure in the supercritical processing system, when a deviation of about ±25 pounds per square inch from the pre-defined pressure is received by the controller.

15. The apparatus of claim 14, wherein the response time for adjusting the pressure is about 1 second.

16. The apparatus of claim 15, wherein the total time required for a signal to pass from the pressure monitor, to the controller, and from the controller to the volume adjusting mechanism is about 100 milliseconds.

17. The apparatus of claim 1, wherein the ratio of the maximum volume of the supercritical processing system to the maximum volume of the vessel is between about 16:1 and 4:1.

18. The apparatus of claim 1, wherein the ratio of the maximum volume of the supercritical processing system to the maximum volume of the vessel is about 7:1.

19. The apparatus of claim 1, wherein the volume adjusting mechanism comprises a syringe pump.

20. A method of controlling the pressure within a supercritical processing system, the method comprising:
    (a) detecting a pressure deviation of a pressure within the supercritical processing system from a pre-defined pressure to a second pressure; and
    (b) changing a volume of the supercritical processing system to return the pressure within the supercritical processing system to approximately the pre-defined pressure by driving a piston contained within a vessel in fluid communication with the supercritical fluid processing system.

21. The method of claim 20, wherein the nominal operating pressure within the supercritical processing system is between about 1,000 and 5,000 pounds per square inch.

22. The method of claim 21, wherein the pressure deviation is about ±100 pounds per square inch from the pre-defined pressure.

23. The method of claim 21, wherein the pressure deviation is about ±25 pounds per square inch from the pre-defined pressure.

24. The method of claim 20, wherein (b) is performed in between about 1 and 2 seconds.

25. The method of claim 20, wherein (b) is performed in about 1 second.

26. The method of claim 20, wherein (a) is performed using a pressure monitor configured to measure the pressure in the supercritical processing system and a controller configured to receive pressure information from the pressure monitor and deliver instructions to the piston, based on comparison of the pressure information with the pre-defined pressure.

27. The method of claim 26, wherein the controller comprises a microprocessor or a computer, each with an associated logic for receiving pressure information from the pressure monitor and delivering instructions to the piston, based on comparison of the pressure information with the pre-defined pressure.

28. The method of claim 27, wherein the total time required for a signal to pass from the pressure monitor, to the controller, and from the controller to the piston is between about 30 and 200 milliseconds.

29. The method of claim 28, wherein the piston comprises a syringe pump.

30. The method of claim 27, wherein the total time required for a signal to pass from the pressure monitor, to the controller, and from the controller to the piston is about 100 milliseconds.

31. A method of controlling pressure within a supercritical processing system, the method comprising:
(a) receiving information for an anticipated pressure deviation, from a pre-defined pressure to a second pressure, due to a solute addition to a supercritical medium within said supercritical processing system; and
(b) applying a corrective pressure deviation, approximately equal in magnitude but opposite in value to said anticipated pressure deviation, to compensate for the anticipated pressure deviation;
wherein (b) is performed by changing a volume of the supercritical processing system by driving a piston contained within a vessel in fluid communication with the supercritical fluid processing system.

32. The method of claim 31, wherein the nominal operating pressure within the supercritical processing system is between about 1000 and 5,000 pounds per square inch.

33. The method of claim 32, further comprising choosing solute addition parameters so that the anticipated pressure deviation is about ±100 pounds per square inch from the pre-defined pressure.

34. The method of claim 32, further comprising choosing solute addition parameters so that the anticipated pressure deviation is about ±25 pounds per square inch from the pre-defined pressure.

35. The method of claim 31, wherein (a) is performed using a pressure monitor configured to measure the pressure in the supercritical fluid processing system and a controller configured to receive pressure information from the pressure monitor and deliver instructions to the piston, based on comparison of the pressure information with the pre-defined pressure.

36. The method of claim 35, wherein the controller comprises a microprocessor or a computer, each with an associated logic for receiving pressure information from the pressure monitor and delivering instructions to the piston, based on comparison of the pressure information with the pre-defined pressure.

37. The method of claim 36, wherein the total time required for a signal to pass from the pressure monitor, to the controller, and from the controller to the piston is between about 30 and 200 milliseconds.

38. The method of claim 36, wherein the total time required for a signal to pass from the pressure monitor, to the controller, and from the controller to the piston is about 100 milliseconds.

39. The method of claim 35, wherein the piston and the vessel comprise a syringe pump.

* * * * *